United States Patent [19]
Ford et al.

[11] Patent Number: 5,762,138
[45] Date of Patent: Jun. 9, 1998

[54] METHOD OF PREVENTING INCOMPATIBILITY BETWEEN AQUEOUS WELL TREATING FLUIDS AND HYDROCARBONS

[75] Inventors: William G. F. Ford; Tommy R. Gardner; Karen L. King, all of Duncan, Okla.

[73] Assignee: Halliburton Energy Services, Inc., Duncan, Okla.

[21] Appl. No.: 781,315

[22] Filed: Dec. 9, 1996

[51] Int. Cl.⁶ .......................... E21B 37/06; E21B 43/22; E21B 43/26; E21B 43/27

[52] U.S. Cl. .......................... 166/279; 166/307; 166/308; 252/332; 507/255; 507/259; 507/265; 507/266; 507/923

[58] Field of Search .................. 166/279, 305.1, 166/307, 308, 310; 252/332; 507/255, 259, 265, 266, 923, 933

[56] References Cited

U.S. PATENT DOCUMENTS

| | | | |
|---|---|---|---|
| 2,110,847 | 3/1938 | DeGroote | 292/332 |
| 2,178,830 | 11/1939 | Bruson | 252/332 X |
| 3,481,870 | 12/1969 | Cheng et al. | 166/304 X |
| 4,073,344 | 2/1978 | Hall | 166/307 |
| 4,823,874 | 4/1989 | Ford | 166/279 |
| 5,008,026 | 4/1991 | Gardner et al. | 252/8.553 |
| 5,445,221 | 8/1995 | Vinson | 166/279 |
| 5,543,387 | 8/1996 | Mokadam et al. | 507/255 X |

*Primary Examiner*—George A. Suchfield
*Attorney, Agent, or Firm*—Robert A. Kent; Clark Dougherty, Jr.

[57] ABSTRACT

The present invention provides microemulsion surfactant additives for use in aqueous well treating fluids to prevent the formation of stable emulsions and sludge when the aqueous treating fluids contact hydrocarbons. The additives are basically comprised of a solvent, a co-solvent, water, an aqueous liquid-hydrocarbon liquid de-emulsifying surfactant and a liquid hydrocarbon antisludging surfactant. Aqueous compositions including the additives and methods of treating subterranean formations or zones containing hydrocarbons using the compositions are also provided.

26 Claims, No Drawings

5,762,138

METHOD OF PREVENTING INCOMPATIBILITY BETWEEN AQUEOUS WELL TREATING FLUIDS AND HYDROCARBONS

BACKGROUND OF THE INVENTION

1. Field of the Invention.

The present invention relates to additives, aqueous treating fluids including the additives and methods of using the treating fluids for performing stimulation operations and the like in oil and gas wells.

2. Description of the Prior Art.

Aqueous well treating fluids are commonly used to complete wells and to stimulate the production of hydrocarbons from subterranean formations or zones penetrated by the wells. Such aqueous treating fluids can include one or more acids, one or more gelling agents to increase the viscosities of the fluids, fluid loss control additives, corrosion inhibiting additives and a variety of other additives known to those skilled in the art. The treating fluids and methods of using them typically function to improve the flow rates of hydrocarbons that can be produced from the subterranean formations or zones.

In well treatments commonly referred to as "acidizing," an aqueous treating fluid containing one or more acids is introduced into a producing zone by way of the well bore penetrating the zone to increase the permeability of the zone and/or to etch new flow channels therein. In treatments known as "fracture acidizing," an aqueous treating fluid is forced into a subterranean zone at a rate and pressure such that one or more fractures are produced in the zone. An aqueous treating fluid containing one or more acids is then pumped into the fractures which etches flow channels in the fracture faces and enlarges existing pore spaces whereby hydrocarbons more readily flow through the zone into the well bore.

Fracturing treatments are typically carried out in subterranean producing formations or zones to create flow paths of increased permeability in the formations or zones through which hydrocarbons readily pass. Aqueous treating fluids containing one or more gelling agents to increase the viscosities of the fluids are commonly utilized which have propping agent suspended therein. In performing a fracturing treatment, the viscous aqueous treating fluid containing propping agent is pumped into the subterranean formation or zone at a rate and pressure such that fractures are created therein. The fractures are extended by continued pumping, and upon termination of the pumping, the propping agent is deposited in the fractures. The propping agent functions to prevent the fractures from closing and is of a size such that increased flow of hydrocarbons through the fractures results.

A problem that often occurs in acidizing and fracturing treatments involves the formation of undesirable emulsions and sludges. That is, when an aqueous treating fluid contacts hydrocarbons contained in a subterranean formation or zone being treated, stable aqueous treating fluid-liquid hydrocarbon emulsions and hydrocarbon sludges are formed which remain in the formation or zone and defeat the purpose of the treatment by plugging or partially plugging the larger pore spaces, flow channels and/or fractures formed during the treatment.

In order to improve the compatibilities of aqueous treating fluids with hydrocarbons contacted in subterranean formations or zones, a variety of surfactants have heretofore been included in the aqueous treating fluids. While the presence of such surfactants in the treating fluids have lessened the formation of stable emulsions and sludges, problems resulting from the formation of stable emulsions and sludges still occur. For example, in hydrocarbon containing sandstone formations located offshore, acidizing treatments with aqueous acid treating fluids can materially increase hydrocarbon production from the formations. In attempts to prevent stable emulsions and sludges from being formed, anionic and nonionic surfactants have been included in the aqueous treating fluids as well as mutual solvents for preventing the surfactants from plating out onto the sandstone formations. While the inclusion of such surfactants and mutual solvents has achieved some degree of success, stable emulsions and sludges have still been produced and plugging or at least partial plugging of the sandstone formations has occurred as a result.

Thus, there is a need for improved stable emulsion and sludge preventing additives, aqueous treating fluid compositions including the additives and methods for treating subterranean formations with the aqueous treating fluid compositions whereby stable emulsions, sludges and the like are prevented from being formed.

SUMMARY OF THE INVENTION

The present invention provides improved microemulsion surfactant additives for use in aqueous well treating fluids, improved aqueous well treating fluid compositions including the additives and improved methods of treating hydrocarbon containing subterranean formations using the compositions which meet the needs described above and overcome the deficiencies of the prior art.

The microemulsion surfactant additives of the present invention are basically comprised of a solvent selected from the group consisting of hexylene glycol, other glycols having in the range of from 1 to about 10 carbon atoms and glycol ethers having in the range of from 1 to about 10 carbon atoms, a co-solvent selected from the group consisting of isopropyl alcohol, other branched alkyl alcohols having in the range of from 1 to about 10 carbon atoms and linear alkyl alcohols having in the range of from 1 to about 10 carbon atoms, water, an aqueous liquid-hydrocarbon liquid de-emulsifying surfactant comprised of an alkyldiphenyloxide sulfonic acid and a liquid hydrocarbon anti-sludging surfactant selected from the group consisting of alkylbenzene and alkylnaphthalene sulfonic acids and salts.

When the above described components are mixed with stirring in the order listed above, a stable water external microemulsion results which does not separate into mutually insoluble phases. As a result, when the microemulsion is combined with an aqueous treating fluid, the surfactants and other components of the microemulsion remain in the treating fluid.

A particular benefit of the microemulsion surfactant additives of this invention is that the additives are compatible with acid corrosion inhibiting formulations and other aqueous treating fluid additives commonly included in subterranean formation acidizing and fracturing fluids. That is, the microemulsion surfactant additive is not adversely affected by corrosion inhibitors and the like, and as a result, the surfactants do not plate out on the rock materials making up a formation being treated and are not otherwise adversely affected whereby the formation of stable emulsions and sludges result. Additional benefits of the microemulsion surfactant additives of this invention, among others, are that the additives are very economical in cost and leave the treated formation surfaces water wet, a condition which promotes oil flow through the treated formation.

Aqueous treating fluid compositions containing the additives and methods of using the compositions are also provided by the present invention.

It is, therefore, a general object of the present invention to provide improved surfactant additives, aqueous subterranean formation treating fluid compositions and methods of using the compositions to treat subterranean formations whereby stable aqueous liquid-hydrocarbon liquid emulsions and sludges are prevented from being formed in the formations.

Other and further objects, features and advantages of the present invention will be readily apparent to those skilled in the art upon a reading of the description of preferred embodiments which follows.

DESCRIPTION OF THE PREFERRED EMBODIMENTS

The present invention provides microemulsion surfactant additives for use in aqueous well treating fluids which are compatible with corrosion inhibitors and other additives utilized in aqueous treating fluids. Further, the presence of an additive of this invention in an aqueous treating fluid improves the overall compatibility of the aqueous treating fluid with hydrocarbons in the subterranean formation being treated thereby preventing stable aqueous liquid-hydrocarbon liquid emulsions and hydrocarbon sludges from being formed.

The microemulsion surfactant additives of this invention are basically comprised of a solvent which functions to make otherwise insoluble chemicals soluble in an aqueous medium, a co-solvent to enhance the performance of the solvent and to aid in the formation and maintenance of a stable microemulsified dispersion of the non-aqueous components in an aqueous medium, water, an aqueous liquid-hydrocarbon liquid de-emulsifying surfactant comprised of an alkyldiphenyloxide sulfonic acid, and a liquid hydrocarbon antisludging surfactant selected from the group consisting of alkylbenzene and alkylnaphthalene sulfonic acids and salts.

The solvent is preferably selected from the group consisting of hexylene glycol, other glycols having in the range of from 1 to about 10 carbon atoms and glycol ethers having in the range of from 1 to about 10 carbon atoms, and is present in the microemulsion surfactant additive in an amount in the range of from about 1% to about 90% by weight of the additive. More preferably, the solvent is hexylene glycol present in the additive in an amount in the range of from about 20% to about 30% by weight of the additive, most preferably in an amount of about 21.4%.

The co-solvent is preferably selected from the group consisting of isopropyl alcohol, other branched alkyl alcohols having in the range of from 1 to about 10 carbon atoms and linear alkyl alcohols having in the range of from 1 to about 10 carbon atoms, and is present in the additive in an amount in the range of from about 1% to about 90% by weight of the additive. More preferably, the co-solvent is isopropyl alcohol present in the additive in an amount in the range of from about 15% to about 30% by weight of the additive, most preferably in an amount of about 19%.

The water in the additive can be any water which does not adversely react with the other components in the additive. The water is preferably present in the additive in an amount in the range of from about 1% to about 90% by weight of the additive. More preferably, the water is fresh water present in the additive in an amount in the range of from about 1% to about 10% by weight of the additive, most preferably in an amount of about 4.6%.

The de-emulsifying surfactant, i.e., the alkyldiphenyloxide sulfonic acid, is generally present in the additive in an amount in the range of from about 5% to about 70% by weight of the additive. The alkyl substituent in the surfactant can be a linear or branched alkyl group having in the range of from about 6 to about 16 carbon atoms. Such a surfactant is commercially available under the trade name "CALFAX DBA-70™" from the Pilot Chemical Company of Santa Fe Springs, Calif. Preferably, the de-emulsifying surfactant is tetraisopropyldiphenyloxide sulfonic acid present in the additive in an amount in the range of from about 40% to about 60% by weight of the additive, most preferably in an amount of about 50%.

The liquid hydrocarbon antisludging surfactant selected from the group consisting of alkylbenzene and alkylnaphthalene sulfonic acids and salts is generally included in the additive in an amount in the range of from about 1% to about 20% by weight of the additive. The alkyl substituents can be linear or branched alkyl groups having in the range of from 1 to about 10 carbon atoms. Most preferably, the antisludging surfactant is dodecylbenzene sulfonic acid present in an amount of about 5% by weight of the additive.

In forming the microemulsion surfactant additives of this invention, the components are combined in the order listed above with vigorous stirring to form a stable water external microemulsion. That is, the co-solvent is combined with the solvent followed by the water, the de-emulsifying surfactant and the antisludging surfactant.

As mentioned above, the microemulsion surfactant additives of this invention are stable, i.e., they do not separate into mutually insoluble phases, and when the microemulsion surfactant additives are combined with aqueous treating fluids, the surfactants and other components of the additives remain in the treating fluids, do not adversely react with treating fluid additives and the like and do not plate out on treated formation surfaces. A particular advantage of the microemulsion surfactant additives of this invention is that they are generally compatible with corrosion inhibiting formulations utilized in aqueous acid containing treating fluids as well as other additives commonly utilized in carrying out fracturing and acidizing procedures. In addition, the microemulsion surfactant additives are very economical in cost and leave the treated formation surfaces water wet. When the surfaces of a hydrocarbon producing formation are water wet, the flow of hydrocarbons through the formation is promoted.

The improved aqueous treating fluid compositions of this invention for treating a subterranean formation or zone containing hydrocarbons are basically comprised of an aqueous fluid and a microemulsion surfactant additive as described above present in the aqueous fluid in an amount in the range of from about 0.1% to about 1.0% by volume of the composition.

When the aqueous fluids in the compositions are aqueous acid containing fluids for carrying out subterranean formation acidizing procedures, the aqueous fluids include one or more acids in an amount in the range of from about 1% to about 99.9% by volume of the treating fluid compositions. Suitable acids include hydrochloric acid, hydrofluoric acid, acidic acid, citric acid, formic acid, glycolic acid and mixtures thereof. The aqueous acid containing treating fluid compositions also preferably include one or more metal corrosion inhibitors present in an amount in the range of from about 0.1% to about 2% by volume of the compositions, and a mutual solvent in an amount in the range of from about 1% to about 10% by volume of the compositions. Preferred metal corrosion inhibitors for use in accordance with this invention are those which are commercially available from Halliburton Energy Services of Duncan, Okla. under the tradenames "HAI-81™" and "HAI-85M™." Preferred mutual solvents are those which are commercially available from Halliburton Energy Services of Duncan, Okla. under the trade designations "MUSOL A™" and MUSOL E™." As mentioned, other aqueous acid containing treating fluid additives which are well known to those skilled in the art can also be included in the compositions of this invention.

The stimulation of subterranean formations or zones by acidizing the formations or zones is well known by those skilled in the art. The acidizing procedure generally involves pumping an aqueous acid containing treating fluid through the pore spaces in a formation or zone whereby the acid reacts with formation materials and enlarges the pore spaces. In carrying out fracture acidizing procedures, fractures are created in a formation or zone and the fracture faces are contacted with acid to create flow channels in the fractures when they close.

When the aqueous treating fluid compositions are aqueous fracturing fluids utilized for carrying out formation fracturing treatments, the aqueous fluids in the compositions generally include one or more gelling agents for increasing the viscosities of the fluids. The stimulation of subterranean formations or zones by hydraulically fracturing the formations or zones is well known to those skilled in the art. The creation of the fractures generally involves pumping a viscous fracturing fluid containing suspended particulate propping agent into a formation or zone at a rate and pressure whereby fractures are created therein. The continued pumping of the fracturing fluid extends the fractures and carries propping agent suspended therein into the fractures. Upon the reduction of the flow of the fracturing fluid and the reduction in pressure exerted thereby, the propping agent is deposited in the fractures and the fractures are prevented from closing by the presence of the propping agent therein.

Typical aqueous fracturing fluids which have been utilized heretofore have been comprised of an aqueous liquid such as fresh water or salt water combined with a gelling agent for increasing the viscosity of the fluid. The increased viscosity reduces fluid loss and allows the fracturing fluid to transport significant concentrations of proppant into the created fractures.

A variety of gelling agents have been utilized including hydratible polymers which contain one or more functional groups such as hydroxyl, cis-hydroxyl, carboxyl, sulfate, sulfonate, amino or amide. Particularly useful such polymers are polysaccharides and derivatives thereof which contain one or more monosaccharide units. Natural hydratible polymers containing the foregoing functional groups and units include guar gum and derivatives thereof and cellulose and derivatives thereof. Hydratible synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone.

Preferred hydratible polymer gelling agents which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water are guar gum and guar derivatives such as hydroxypropylguar and carboxymethylguar and cellulose derivatives such as hydroxyethylcellulose, carboxymethylcellulose and carboxymethylhydroxyethylcellulose.

As is well known by those skilled in the art, the viscosities of aqueous gelling agent solutions of the types described above can be increased by combining cross-linking agents with the solutions. Examples of cross-linking agents which can be utilized are multivalent metal salts or compounds which are capable of releasing metal ions in aqueous solutions. Examples of such multivalent metal ions are chromium, zirconium, antimony, titanium, iron, zinc or aluminum.

The above described gelled or gelled and cross-linked fracturing fluids can also include gel breakers such as those of the enzyme type, the oxidizing type or the acid buffer type which are well known to those skilled in the art. The gel breakers cause the viscous fracturing fluids to revert to thin fluids so that they can be produced back to the surface after they have been used to create fractures and carry propping agent in subterranean formations.

The improved methods of the present invention for treating a subterranean formation or zone containing hydrocarbons with an aqueous treating fluid are basically comprised of the following steps. A microemulsion surfactant additive of this invention is combined with an aqueous treating fluid in an amount in the range of from about 0.1% to about 1.0% by volume of the resulting treating fluid. Thereafter, the treating fluid containing the microemulsion surfactant additive is introduced into a subterranean formation or zone to be treated. As mentioned, the aqueous treating fluid can contain an acid, a gelling agent, or both, as well as other additives which are well known to those skilled in the art.

In order to further illustrate the additives, compositions and methods of this invention, the following examples are given.

EXAMPLE 1

Emulsion tests were conducted utilizing an aqueous acid containing treating fluid composition of the present invention. The treating fluid composition was comprised of fresh water, hydrochloric acid in an amount of about 15% by volume of the composition, a corrosion inhibiting formulation marketed under the trade designation "HAI-81M™" by Halliburton Energy Services of Duncan, Okla. in an amount of about 0.3% by volume of the composition, a mutual solvent marketed under the trade designation "MUSOL A™" by Halliburton Energy Services of Duncan, Okla. in an amount of about 5% by volume of the composition and a microemulsion surfactant additive of the present invention in an amount of about 0.5% by volume of the composition.

The microemulsion surfactant additive was comprised of hexylene glycol solvent in an amount of about 21.4% by weight of the additive, isopropyl alcohol co-solvent in an amount of about 19% by weight of the additive, water in an amount of about 4.6% by weight of the additive, a de-emulsifying surfactant comprised of tetraisopropyldiphenyloxide sulfonic acid in an amount of about 50% by weight of the additive and an antisludging surfactant comprised of dodecylbenzene sulfonic acid present in an amount of about 5% by weight of the additive.

The emulsion tests utilized samples of various crude oils obtained from sandstone formations in the Gulf Coast region of the United States. The emulsion tests were conducted by adding 50 milliliters of a crude oil sample to a 300 milliliter beaker followed by the addition of 50 milliliters of the above described aqueous acid containing treating fluid composition of this invention. The contents of the beaker were then stirred for 1 minute with a high speed Eberbach stirrer. The resulting emulsion was poured into a 100 milliliter graduated cylinder, and the "percent break" of the emulsion, i.e., the percent of separation of the emulsion, at ambient temperature was observed as a function of time.

The results of these tests are set forth in Table I below.

TABLE I

Aqueous Treating Fluid Composition[1] Crude Oil Emulsion Break Tests[2]

| Crude Oil Used | Percent Break |
| --- | --- |
| Main Pass 313 A | 100 |
| Ship Shoal 178 | 100 |
| Eugene Island B-9 | 100 |
| Eugene Island E-2 | 100 |
| Eugene Island 276 | 70[3] |
| South Timbailer | 100 |
| South Main Pass 78 | 100 |
| South Pass Field | 100 |
| Lake Baffe | 80[3] |
| Houma C9HG | 62[3] |
| Houma C5HO | 72[3] |
| South Timbailer | 100[4] |
| South Main Pass 78 | 100[4] |

[1]Composition comprised of fresh water; about 15% HCl by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL A ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]100% Break occurred after 15 minutes.
[4]"HAI-85M ™" marketed by Halliburton Energy Services substituted for "HAI-81M ™."

As shown in Table I, a 100% separation between the aqueous acid containing treating fluid composition and the crude oil sample occurred within 10 minutes in every test except four. In those four, 100% separation occurred within 15 minutes.

EXAMPLE 2

The test procedure described in Example 1 was repeated using an aqueous acid containing treating fluid composition comprised of hydrochloric acid in an amount of about 7.5% by volume of the composition, hydrofluoric acid in an amount of about 1.5% by volume of the composition, a corrosion inhibitor formulation marketed under the trade designation "HAI-81M™" by Halliburton Energy Services of Duncan, Okla. in an amount of about 0.3% by volume of the composition, a mutual solvent marketed under the trade designation "MUSOL A™" by Halliburton Energy Services of Duncan, Okla. in an amount of about 5% by volume of the composition and the microemulsion surfactant additive described in Example 1 in an amount of about 0.5% by volume of the composition. The results of these tests are set forth in Table II below.

TABLE II

Aqueous Treating Fluid Composition[1] Crude Oil Emulsion Break Tests[2]

| Crude Oil Used | Percent Break |
| --- | --- |
| Main Pass 313 A | 100 |
| Ship Shoal 178 | 100 |
| Eugene Island B-9 | 100 |
| Eugene Island E-2 | 100 |
| Eugene Island 276 | 100 |
| South Timbailer | 100 |
| South Main Pass 78 | 100 |
| South Pass Field | 100 |
| Lake Baffe | 100 |
| Houma C9HG | 100 |
| Houma C5HO | 100 |
| South Timbailer | 100[3] |
| South Main Pass 78 | 100[3] |

[1]Composition comprised of fresh water; about 7.5% HCl and 1.5% HF by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL A ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]Composition[1] tested after being spent.

As shown in Table II, a 100% separation occurred between the aqueous acid containing treating fluid composition and the crude oil sample within 10 minutes in every test.

EXAMPLE 3

The procedure of Example 1 was repeated except that the mutual solvent included in the aqueous acid containing treating fluid composition was the mutual solvent marketed under the trade designation "MUSOL E™" by Halliburton Energy Services of Duncan, Okla. instead of "MUSOL A™." The results of these tests are shown in Table III below.

TABLE III

Aqueous Treating Fluid Composition[1] Crude Oil Emulsion Break Tests[2]

| Crude Oil Used | Percent Break |
| --- | --- |
| Ship Shoal 178 | 100 |
| Eugene Island B-9 | 100 |
| Eugene Island E-2 | 100 |
| South Timbailer | 100 |
| South Main Pass 78 | 100 |
| South Pass Field | 100 |
| South Timbailer | 100[3] |
| South Main Pass 78 | 100[3] |

[1]Composition comprised of fresh water; about 15% HCl by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]"HAI-85M ™" marketed by Halliburton Energy Services substituted for "HAI-81M ™."

From Table III it can be seen that a 100% separation occurred between the aqueous acid containing treating fluid composition and the crude oil sample within 10 minutes in every test.

EXAMPLE 4

The procedure described in Example 1 was repeated using the aqueous acid containing treating fluid composition described in Example 2 except that the mutual solvent marketed under the trade designation "MUSOL E™" by Halliburton Energy Services of Duncan, Okla. was substituted for the mutual solvent marketed under the trade designation "MUSOL A™." The results of these tests are shown in Table IV below.

TABLE IV

Aqueous Treating Fluid Composition[1] Crude Oil Emulsion Break Tests[2]

| Crude Oil Used | Percent Break |
| --- | --- |
| Ship Shoal 178 | 100 |
| Eugene Island B-9 | 100 |
| Eugene Island E-2 | 100 |
| South Timbailer | 100 |
| South Main Pass 78 | 100 |
| South Timbailer | 100[3] |
| South Main Pass 78 | 100[3] |

[1]Composition comprised of fresh water; about 7.5% HCl and 1.5% HF by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]Composition[1] tested after being spent.

From Table IV it can be seen that a 100% separation between the aqueous acid containing treating fluid composition and the crude oil sample occurred within 10 minutes in every test.

EXAMPLE 5

The test procedure of Example 1 was repeated except that the aqueous acid containing treating fluid composition was reacted with simulated formation materials until spent prior to conducting the tests. The results of these tests are given in Table V below.

TABLE V

Aqueous Treating Fluid Composition[1] Crude Oil Emulsion Break Tests[2]

| Crude Oil Used | Percent Break |
| --- | --- |
| South Timbailer | 100 |
| South Main Pass 78 | 100 |
| South Timbailer | 100[3] |
| South Main Pass 78 | 100[3] |

[1]Composition comprised of fresh water; about 7.5% HCl and 1.5% HF by vol. of composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]"HAI-85M ™" marketed by Halliburton Energy Services substituted for "HAI-81M ™."

From Table V it can be seen that a 100% separation between the spent aqueous acid containing treating fluid composition and the crude oil sample occurred within 10 minutes in every test.

EXAMPLE 6

The procedure of Example 1 was repeated except that the aqueous acid containing treating fluid composition was reacted until spent prior to conducting the tests, and the mutual solvent marketed under the trade designation "MUSOL E™" was substituted for "MUSOL A™." The results of these tests are set forth in Table VI below.

TABLE VI

Aqueous Treating Fluid Composition[1] Crude Oil Emulsion Break Tests[2]

| Crude Oil Used | Percent Break |
| --- | --- |
| South Timbailer | 100 |
| South Main Pass 78 | 100 |
| South Timbailer | 100[3] |
| South Main Pass 78 | 100[3] |

[1]Composition comprised of fresh water; about 15% HCl by vol. of the composition; about 0.3% by vol. of the composition of a corrosion inhibitor formulation marketed under the trade designation "HAI-81 ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Microemulsion Surfactant Additive of this invention.
[2]Percent Break after 10 minutes at Ambient Temperature.
[3]"HAI-85M ™" marketed by Halliburton Energy Services substituted for "HAI-81M ™."

From Table VI it can be seen that a 100% separation between the spent aqueous acid containing treating fluid composition and the crude oil sample occurred within 10 minutes in every test.

EXAMPLE 7

The test procedure described in Example 1 was repeated except that the mutual solvent marketed under the trade designation "MUSOL E™" was substituted for the mutual solvent marketed under the trade designation "MUSOL A™" and a commercially available prior art surfactant marketed under the trade designation "TRI-S™" by Halliburton Energy Services of Duncan, Okla. was substituted for the microemulsion surfactant additive of the present invention. The results of these tests are set forth in Table VII below.

TABLE VII

Aqueous Treating Fluid Composition[1] Crude Oil Emulsion Break Tests[2]

| Crude Oil Used | Percent Break |
| --- | --- |
| South Timbailer | 80 |
| Lake Baffe | 44 |
| Eugene Island 276 | 92 |
| South Pass Field | 0 |
| Main Pass 313 A | 94 |

[1]Composition comprised of fresh water; about 15% HCl by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Prior Art Surfactant Additive marketed under the trade designation "TRI-S ™" by Halliburton Energy Services.
[2]Percent Break after 10 minutes at Ambient Temperature.

As shown in Table VII, a complete separation of the aqueous acid containing treating fluid composition and the crude oil sample did not take place in any of the tests within 10 minutes.

EXAMPLE 8

The test procedure of Example 7 was repeated except that the aqueous acid containing treating fluid composition was spent prior to the test. The results of these tests are set forth in Table VIII below.

TABLE VIII

Aqueous Treating Fluid Composition[1] Crude Oil Emulsion Break Tests[2]

| Crude Oil Used | Percent Break |
| --- | --- |
| South Timbailer | 0 |
| Lake Baffe | 0 |
| Eugene Island 276 | 0 |
| South Pass Field | 0 |
| Main Pass 313 A | 0 |

[1]Composition comprised of fresh water; about 15% HCl by vol. of the composition; about 0.3% by vol. of the composition of a corrosion inhibitor formulation marketed under the trade designation "HAI-81M ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Prior Art Surfactant Additive marketed under the trade designation "TRI-S ™" by Halliburton Energy Services.
[2]Percent Break after 10 minutes at Ambient Temperature.

From Table VIII it can be seen that no separation took place between the aqueous acid containing treating fluid composition and the crude oil sample within 10 minutes in any of the tests.

EXAMPLE 9

The test procedure of Example 7 was repeated except that the corrosion inhibitor marketed under the trade designation "HAI-85M™" was substituted for the corrosion inhibitor "HAI-81M™." The results of these tests are set forth in Table IX below.

TABLE IX

Aqueous Treating Fluid Composition[1] Crude Oil Emulsion Break Tests[2]

| Crude Oil Used | Percent Break |
| --- | --- |
| South Timbailer | 100 |
| Lake Baffe | 0 |
| Eugene Island 276 | 0 |
| South Pass Field | 60 |
| Main Pass 313 A | 34 |

[1]Composition comprised of fresh water; about 15% HCl by vol. of composition; about 0.3% by vol. of the composition of a corrosion inhibitor formulation marketed under the trade designation "HAI-85 ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Prior Art Surfactant Additive marketed under the trade designation "TRI-S ™" by Halliburton Energy Services.
[2]Percent Break after 10 minutes at Ambient Temperature.

From Table IX it can be seen that a 100% separation between the aqueous acid containing treatment fluid composition and the crude oil sample occurred in 10 minutes in only one test.

EXAMPLE 10

The procedure of Example 9 was repeated except that the aqueous acid containing treating fluid composition was spent prior to conducting the tests. The results of these tests are set forth in Table X below.

TABLE X

Aqueous Treating Fluid Composition[1] Crude Oil Emulsion Break Tests[2]

| Crude Oil Used | Percent Break |
| --- | --- |
| South Timbailer | 40 |
| Lake Baffe | 0 |
| Eugene Island 276 | 0 |
| South Pass Field | 0 |
| Main Pass 313 A | 100 |

[1]Composition comprised of fresh water; about 15% HCl by vol. of composition; about 0.3% by vol. of the composition of a corrosion inhibitor formulation marketed under the trade designation "HAI-85 ™" by Halliburton Energy Services of Duncan, Oklahoma; about 5% by vol. of the composition of a mutual solvent marketed under the trade designation "MUSOL E ™" by Halliburton Energy Services of Duncan, Oklahoma; and about 0.5% by vol. of the composition of the Prior Art Surfactant Additive marketed under the trade designation "TRI-S ™" by Halliburton Energy Services.
[2]Percent Break after 10 minutes at Ambient Temperature.

From Table X it can be seen that a 100% separation between the aqueous acid containing treating fluid composition and the crude oil sample occurred in 10 minutes in only one of the test.

EXAMPLE 11

Water wetting tests were conducted utilizing three test aqueous acid containing treating fluid compositions as follows.

Test Solution 1—An aqueous acid solution containing hydrochloric acid in an amount of about 15% by volume of the solution and the microemulsion surfactant additive of this invention described in Example 1 in an amount of about 1% by volume of the solution.

Test Solution 2—A spent aqueous acid solution which originally contained hydrochloric acid in an amount of about 15% by volume of the solution and the microemulsion surfactant additive of this invention described in Example 1 above in an amount of about 1% by volume of the solution.

Test Solution 3—A spent aqueous acid solution which originally contained hydrochloric acid in an amount of about 7.5% by volume of the solution, hydrofluoric acid in an amount of about 1.5% by volume of the solution and the microemulsion surfactant additive of this invention described in Example 1 above in an amount of about 1% by volume of the solution.

The test procedure used in performing the water wetting tests was the Visual Wettability Test Procedure set forth in API RECOMMENDED PRACTICES FOR LABORATORY TESTING OF SURFACE ACTIVE AGENTS FOR WELL STIMULATION, API RP42, 2nd Edition, January, 1977, published by the American Petroleum Institute, Washington, D.C. The results of these tests are shown in Table XI below.

TABLE XI

Aqueous Treating Fluid Composition Water Wetting Tests

Test Acid Solution 1 - Water Wet
Test Spent Acid Solution 2 - Water Wet
Test Spent Acid Solution 3 - Water Wet From Table XI it can be seen that the presence of the microemulsion surfactant additive of this invention in the test solutions left sand in a water wet condition.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A microemulsion surfactant additive for use in aqueous well treating fluids to prevent the formation of stable emulsions and sludge when the aqueous treating fluids contact hydrocarbons comprising:

a solvent selected from the group consisting of hexylene glycol, other glycols having in the range of from 1 to about 10 carbon atoms and glycol ethers having in the range of from 1 to about 10 carbon atoms;

a co-solvent selected from the group consisting of isopropyl alcohol, other branched alkyl alcohols having in the range of from 1 to about 10 carbon atoms and linear alkyl alcohols having in the range of from 1 to about 10 carbon atoms;

water;

an aqueous liquid-hydrocarbon liquid de-emulsifying surfactant comprised of an alkyldiphenyloxide sulfonic acid; and a liquid hydrocarbon antisludging surfactant selected from the group consisting of alkylbenzene and alkylnaphthalene sulfonic acids and salts.

2. The additive of claim 1 wherein said solvent is present in an amount in the range of from about 1% to about 90% by weight of said additive.

3. The additive of claim 1 wherein said co-solvent is present in an amount in the range of from about 1% to about 90% by weight of said additive.

4. The additive of claim 1 wherein said water is present in an amount in the range of from about 1% to about 90% by weight of said additive.

5. The additive of claim 1 wherein said de-emulsifying surfactant is present in an amount in the range of from about 5% to about 70% by weight of said additive.

6. The additive of claim 1 wherein said antisludging surfactant is present in an amount in the range of from about 1% to about 20% by weight of said additive.

7. The additive of claim 1 wherein said solvent is hexylene glycol.

8. The additive of claim 7 wherein said co-solvent is isopropyl alcohol.

9. The additive of claim 8 wherein said de-emulsifying surfactant is tetraisopropyldiphenyloxide sulfonic acid.

10. A microemulsion surfactant additive for use in aqueous well treating fluids to prevent the formation of stable emulsions and sludge when the aqueous treating fluids contact hydrocarbons comprising:

a solvent comprised of hexylene glycol present in an amount in the range of from about 20% to about 30% by weight of said additive;

a co-solvent comprised of isopropyl alcohol present in an amount in the range of from about 15% to about 30% by weight of said additive;

water present in an amount in the range of from about 1% to about 10% by weight of said additive;

an aqueous liquid-hydrocarbon liquid de-emulsifying surfactant comprised of tetraisopropyldiphenyloxide sulfonic acid present in an amount in the range of from about 40% to about 60% by weight of said additive; and a liquid hydrocarbon antisludging surfactant comprised of dodecylbenzene sulfonic acid present in an amount in the range of from about 1% to about 20% by weight of said additive.

11. An improved aqueous composition for treating a subterranean formation or a zone containing hydrocarbons comprising:

an aqueous fluid; and a microemulsion surfactant additive for preventing the formation of stable emulsion and sludge when said aqueous fluid contacts hydrocarbons in said formation or zone present in said aqueous fluid in an amount in the range of from about 0.1% to about 1.0% by volume of said composition, said additive being comprised of a solvent selected from the group consisting of hexylene glycol, other glycols having in the range of from 1 to about 10 carbon atoms and glycol ethers having in the range of from 1 to about 10 carbon atoms, a co-solvent selected from the group consisting of isopropyl alcohol, other branched alkyl alcohols having in the range of from 1 to about 10 carbon atoms and linear alkyl alcohols having in the range of from 1 to about 10 carbon atoms, water, an aqueous liquid-hydrocarbon liquid de-emulsifying surfactant comprised of an alkyldiphenyloxide sulfonic acid, and a liquid hydrocarbon antisludging surfactant selected from the group consisting of alkylbenzene and alkylnaphthalene sulfonic acids and salts.

12. The composition of claim 11 which further comprises an acid present in said aqueous fluid.

13. The composition of claim 11 which further comprises a gelling agent present in said aqueous fluid.

14. The composition of claim 11 wherein said mutual solvent is hexylene glycol present in an amount in the range of from about 1% to about 90% by weight of said additive.

15. The composition of claim 14 wherein said co-solvent is isopropyl alcohol present in an amount in the range of from about 1% to about 90% by weight of said additive.

16. The composition of claim 15 wherein said water is present in an amount in an amount in the range of from about 1% to about 10% by weight of said additive.

17. The composition of claim 16 wherein said de-emulsifying surfactant is tetraisopropyldiphenyloxide sulfonic acid present in an amount in an amount in the range of from about 5% to about 70% by weight of said additive.

18. The composition of claim 17 wherein said antisludging surfactant is present in an amount in an amount in the range of from about 1% to about 20% by weight of said additive.

19. An improved method of treating a subterranean formation or zone containing hydrocarbons with an aqueous treating fluid comprising the steps of:

combining a microemulsion surfactant additive for preventing the formation of stable emulsion and sludge when said aqueous treating fluid contacts hydrocarbons in said formation with said aqueous treating fluid in an amount in the range of from about 0.1% to about 1.0% by volume of the resulting treating fluid, said additive comprising a solvent selected from the group consisting of hexylene glycol, other glycols having in the range of from 1 to about 10 carbon atoms and glycol ethers having in the range of from 1 to about 10 carbon atoms, a co-solvent selected from the group consisting of isopropyl alcohol, other branched alkyl alcohols having in the range of from 1 to about 10 carbon atoms and linear alkyl alcohols having in the range of from 1 to about 10 carbon atoms, water, an aqueous liquid-hydrocarbon liquid de-emulsifying surfactant comprised of an alkyldiphenyloxide sulfonic acid, and a liquid hydrocarbon antisludging surfactant selected from the group consisting of alkylbenzene and alkylnaphthalene sulfonic acids and salts; and introducing said treating fluid into said subterranean formation or zone.

20. The method of claim 19 wherein said aqueous treating fluid contains an acid.

21. The method of claim 19 wherein said aqueous treating fluid contains a gelling agent.

22. The method of claim 19 wherein said mutual solvent in said additive is hexylene glycol present in an amount in the range of from about 1% to about 90% by weight of said additive.

23. The method of claim 22 wherein said co-solvent in said additive is isopropyl alcohol present in an amount in the range of from about 1% to about 90% by weight of said additive.

24. The method of claim 23 wherein said water in said additive is present in an amount in an amount in the range of from about 1% to about 90% by weight of said additive.

25. The method of claim 24 wherein said de-emulsifying surfactant in said additive is tetraisopropyldiphenyloxide sulfonic acid present in an amount in an amount in the range of from about 5% to about 70% by weight of said additive.

26. The method of claim 25 wherein said antisludging surfactant in said additive is present in an amount in an amount in the range of from about 1% to about 20% by weight of said additive.

* * * * *